US008117601B2

(12) United States Patent
Owens, II et al.

(10) Patent No.: US 8,117,601 B2
(45) Date of Patent: Feb. 14, 2012

(54) INTERNAL TEST AND MANIPULATION OF AN APPLICATION

(75) Inventors: David Ernest Owens, II, Issaquah, WA (US); Jessica Lynn Fosler, Wollongong (AU)

(73) Assignee: Microsoft Corporation, Redmond, WA (US)

( * ) Notice: Subject to any disclaimer, the term of this patent is extended or adjusted under 35 U.S.C. 154(b) by 1124 days.

(21) Appl. No.: 11/939,953

(22) Filed: Nov. 14, 2007

(65) Prior Publication Data

US 2009/0125886 A1 May 14, 2009

(51) Int. Cl.
G06F 9/44 (2006.01)
G06F 9/45 (2006.01)
G06F 11/00 (2006.01)
G11C 29/00 (2006.01)

(52) U.S. Cl. ........ 717/128; 717/120; 717/130; 717/148; 717/158; 714/35; 714/718

(58) Field of Classification Search .................. None
See application file for complete search history.

(56) References Cited

U.S. PATENT DOCUMENTS

| | | | |
|---|---|---|---|
| 6,141,724 A | 10/2000 | Butler et al. | |
| 6,487,607 B1 | 11/2002 | Wollrath et al. | |
| 7,203,756 B2 | 4/2007 | Tapperson | |
| 7,293,256 B2* | 11/2007 | Crawford | 717/124 |
| 7,325,226 B2* | 1/2008 | Pepin et al. | 717/108 |
| 2003/0233585 A1* | 12/2003 | Quick et al. | 713/202 |
| 2004/0003068 A1* | 1/2004 | Boldman et al. | 709/223 |
| 2005/0102656 A1* | 5/2005 | Viehland et al. | 717/130 |
| 2005/0210449 A1* | 9/2005 | Coley et al. | 717/120 |
| 2005/0216798 A1* | 9/2005 | Yu | 714/718 |
| 2006/0015854 A1* | 1/2006 | Muhlestein et al. | 717/130 |
| 2006/0173894 A1* | 8/2006 | Kristoffersen et al. | 707/102 |
| 2006/0184707 A1* | 8/2006 | Lesartre | 710/306 |
| 2006/0190469 A1* | 8/2006 | Kathuria et al. | 707/101 |
| 2006/0206856 A1* | 9/2006 | Breeden et al. | 717/101 |
| 2007/0169055 A1* | 7/2007 | Greifeneder | 717/158 |
| 2007/0294673 A1* | 12/2007 | Guerrera et al. | 717/130 |
| 2008/0127101 A1* | 5/2008 | Anafi et al. | 717/125 |
| 2009/0172636 A1* | 7/2009 | Griffith et al. | 717/113 |
| 2010/0082733 A1* | 4/2010 | Bernstein et al. | 709/203 |

OTHER PUBLICATIONS

Bai et al., "Scenario-Based Modeling and Its Applications to Object-Oriented Analysis, Design, and Testing", Proc. Of IEEE Words 2002, pp. 140-151.*
Folkerts et al., "Common Test Patterns and Reuse of Test Designs", Jun. 2008, Microsoft Corporation, pp. 1-7.*
Tikir et al., "Efficient Instrumentation for Code Coverage Testing", 2002 ACM, pp. 86-96.*
International Search Report for PCT Application No. PCT/US2008/083222, dated Jun. 26, 2009, 10 pages.

* cited by examiner

*Primary Examiner* — Thuy Dao
*Assistant Examiner* — Ben Wang

(57) ABSTRACT

System(s) and method(s) facilitate testing and manipulating an application internally within a client-server configuration coordinated by a communicator object. A client test-object conveys a test to a server test-object through a remoting channel and over disparate processes, e.g., a test process and designer process. A service in an application developer intermediates communication across a communicator thread and a designer thread. In response to a test, information is received in the client end as a serialized wrapper object. Manipulation is accomplished by deserializing and modifying the received information, and then transmitting the information in a serialized object through the remoting channel across processes, and via the intermediary service component across threads in the designer process. Testing and manipulation can facilitate optimizing an application, improving application's functionality as well as a user experience.

17 Claims, 13 Drawing Sheets

INTERNAL TEST AND MANIPULATION OF AN APPLICATION

TECHNICAL FIELD

The subject description relates to application design and development, and more particularly to tests and manipulation of an application in a consolidated development and design component.

BACKGROUND

In software engineering, application development and design are synergistic endeavors. The former deals primarily with functionality of an application, as well as its software implementation, while the latter largely focuses in implementation aspects directly related to application usability and related aspects, such as user experience. The importance of design becomes readily apparent when it noted that in several business areas, applications typically offer nearly the same functionality among competing market offerings. Thus, elements such as user experience can become a differentiator that can promote market-share gains and retain users.

A key facet of user experience is the quality of an application, which not only is measured through functionality but also in terms of the correctness of the application. As an example, an application that manages an inventory of a wholesale produce and meat delivery enterprise needs accurate information regarding the inventory status as most of the products typically are perishable. In another example, an application that generates investment strategies based on advanced mathematical algorithms needs to be reliable, as inaccuracies in processing data can result in significant financial loss to investors. Typically, applications that manage inventory or forecast financial markets are complex applications; however, other applications are becoming highly complex as a result of integration of functionalities and increased market share. Such complexity can lead to a higher and more critical number of mistakes. Therefore, access to internal aspects of the functionality of an application, such as internal data structures, becomes critical to the success of customers and vendors alike. Generally, access to internal data is limited or inaccurate, particularly when an application is probed through external means. Lacking reliable internal data can be detrimental to superior quality and hence to user satisfaction and market share gains.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

System(s) and method(s) are provided for testing and manipulating an application at design time. Test and manipulation is accomplished in a client-server configuration coordinated by a communicator object, which enables invocation of a test in the client end on the server end. The communicator object is created as a part of a communication framework that connects the client end, embodied embodied in a test and manipulation component, with the server end which includes an application development component including a designer component. Tests applied to the application at design time can be developed in the client end can be stored in a library store. A client end test-object conveys a test to a server test-object through a remoting channel and over disparate processes. A service in the application development component intermediates communication across a communicator thread, associated with a test or a manipulation, and a designer thread. In response to a test, information is received in the client end as a serialized wrapper object. Serialization facilitates interprocess communication. Manipulation of the application is accomplished by deserializing and modifying the received information, and then transmitting the information in a serialized object through the remoting channel via the intermediary service component.

Testing can be employed to profile an application at design time, either periodically or at predetermined times during design. Combined with an optimization component that utilizes an application's profile and user intelligence—e.g., user demographics, consumer behavior, indicia preference, and so forth—manipulation can optimize an application design, improving application's functionality as well as a user experience.

To the accomplishment of the foregoing and related ends, the following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DETAILED DESCRIPTION

Figure 1:
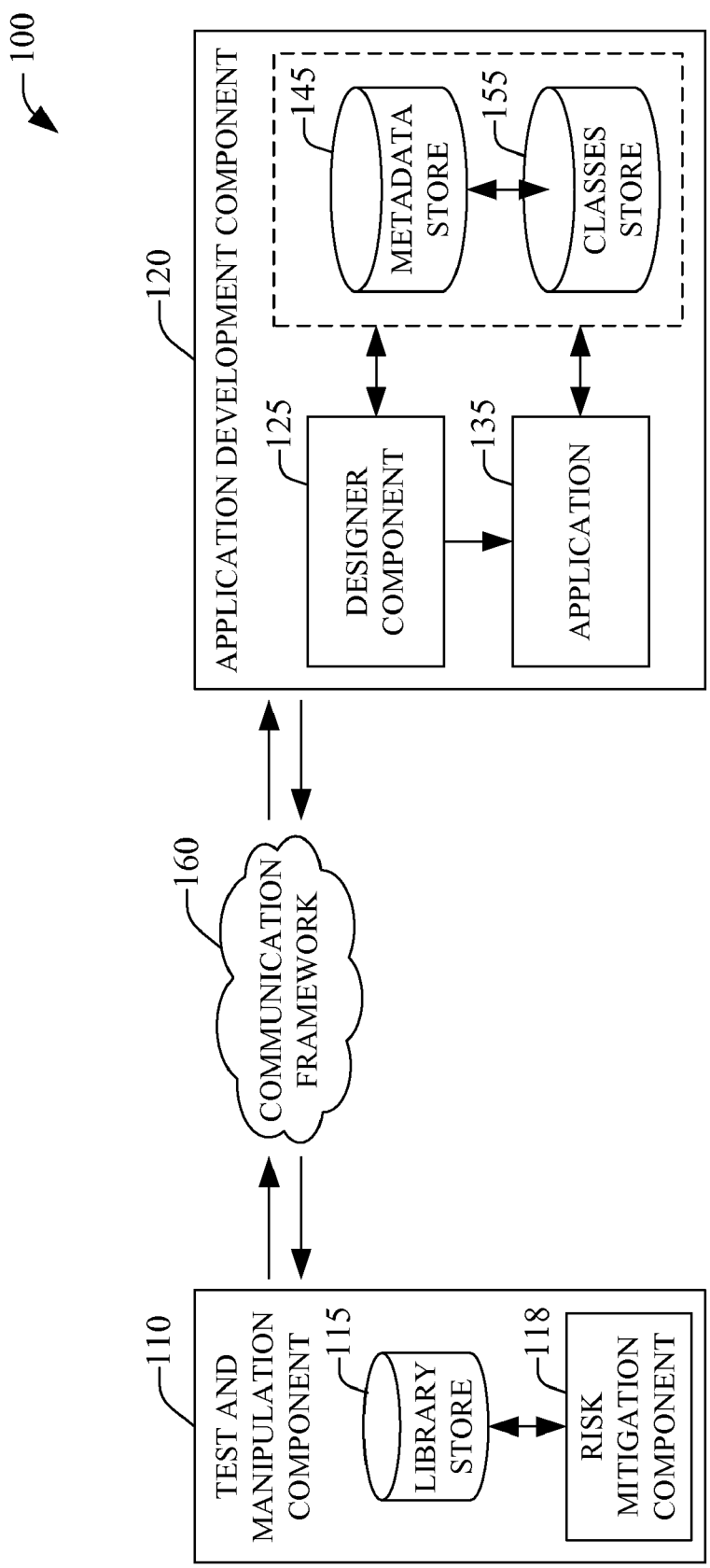
FIG. 1 illustrates a block diagram of an example system to test and manipulate an application according to an aspect of the subject innovation.

The present innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present innovation.

As used in the subject specification, the terms "object," "module," "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In the subject specification, system(s) and method(s) are provided for testing and manipulating an application at design time. Test and manipulation is accomplished in a client-server configuration coordinated by a communicator object. A client end test-object conveys a test to a server test-object through a remoting channel and over disparate processes. A client end is embodied in a test and manipulation component, while a server includes an application development component that comprises a designer component. A service in the application development component intermediates communication across a test/manipulation thread, associated with a test or a manipulation process, and a designer thread within a designer process. In response to a test, information is received in the client end as a serialized wrapper object. Serialization facilitates inter-process communication. Manipulation of the application is accomplished by deserializing and modifying the received information, and then transmitting the information in a serialized object through the remoting channel via the intermediary service component. Testing and manipulation can be employed synergistically to optimize an application design, improving application's functionality as well as a user experience. Such aspects of the subject innovation are described in detail below.

FIG. 1 illustrates a block diagram of an example system 100 to test and manipulate an application within an application designer for the purpose of test automation and validation, as well as dynamic design. Test and manipulation component 110, which includes a library store 115 and a risk mitigation component 118, accesses an application development component 120 that comprises a designer component (or designer layer) 125 coupled to an application 135. Testing and manipulation of application 135 takes place through designer component 125, and communication can take place remotely through a communication framework 160, which can facilitate conveying information among components 110 and 120. The information can be conveyed in response to a test or supplied as part of a modification to application 135. Methods in library store 115 comprise a set of libraries available to test and manipulation component 110, which can be employed to test application 135 at design time as well as runtime, and manipulate it. The methods in the library store 115 can be created outside the application development application component 120, and can be customized for an application (e.g., application 135). Through methods in method library 115, test and manipulation component 110 can expose information related to application 135 that a debug component (not shown) associated with designer component 125 typically would not expose to a user. Such "internal" information in connection with an application can offer insights in the operation of an application and its suitability for a specific task. In an aspect, the methods can be embodied in dynamic linked libraries. It should be appreciated that a test or modification can occur in a different process from the process associated with designer component 125, in connection with design of application 135, within application development component 120.

Risk mitigation component 118 can ensure that internal tests and manipulation of an application do not compromise sensitive information processed by the application, either at design time or runtime. In an aspect, risk mitigation component 118 can enforce reading data from within a tested application (e.g., application 135) in order to maintain substantially the same behavior of the application during a test as when the application is not being tested. Enforcing such behavior can take place through screening the set of library, stored in library store 115, to verify that the method called to apply a test operates on data internal to the application. It should be appreciated that generally an application (or a system) that is probed can substantially change as a result of an applied test (note that in the case of manipulation, a behavior of an application can be intentionally changed): As described hereinafter, a test of an application is facilitated by the test and manipulation component 110 through creation of an extension server or an additional plug-in, such extension server or plug-in can result in the change of behavior of the application. Thus, risk mitigation component 118 facilitates preventing such changes in order to prevent application degradation as the result of a test or manipulation. It is noted that depending on the architecture of the application (e.g., application 135), risk of application degradation is lower, as in the case of an architecture where the application's core internal features (e.g., capability to show context menus) are also added to the application through a plug-in system substantially similar to the one utilized by a test and manipulation component (e.g., component 110) as described herein. In such an application embodiment, a number of plug-ins present in the application fail to increase dramatically when a test is performed, as it is the case in an application that do not support features trough plug-ins. (An increase from N feature plug-ins to N+1 plug-ins including a test plug-in typically can cause lesser changes in code path compared to introducing a test plug-in in an application that does not posses a feature plug-in (e.g., N=0.)

In an aspect, application 135 is an object-oriented or component-oriented application, where code that provides functionality to the application includes classes and metadata that can describe said classes and associated methods which confer the application its functionality. As an example, the code can be managed code within the Microsoft® .NET Common Language Runtime (CLR), based on high-level languages such as Microsoft® Visual Basic, Microsoft® C#, Java™, Smalltalk, C++, Delphi, Perl, and so on. Application development component 125 further includes a metadata store 145 and a class store 155, which can include metadata and class information that characterizes application 135. It is noted that dependencies and class hierarchies can also be stored in class store 155. Metadata and classes in application 135 code can be associated, with metadata primarily describing the classes in the application 135 as well as in other classes in class store 155. The inclusion of metadata in the classes present in the code of application 135, and classes that describe features associated with the application 135, can provide for extending such classes. Such an extensibility model can be exploited by test and manipulation component 110 to collect information on application 135 or modify said application, and can be supported by designer component 125. In an example designer component 125, an extensibility model can be based on an EXTENSION base class and associated EXTENSIONSERVER class which can afford access to services for extensions (e.g., modified classes)—the services available through the designer component 125—as well as ensure adequate dependencies are maintained among multiple extensions. Moreover, within the example designer component 125, EXTENSIONSERVER can access an EDITINGCONTEXT class (via a Context property) which provides access to designer services. It should be appreciated that designer services can be native to the designer component (e.g., designer component 125) or can be effected through an application development component (e.g., component 120). Typically, there can be a single EXTENSIONSERVER and multiple EXTENSION classes, each EXTENSION corresponding to the creation of some element on a designer surface. It should be appreciated that other objects/classes that modify existing classes by introducing custom attributes through extensions, and access available services to a designer component (e.g., component 125) through a server object, can be utilized to implement an extensibility model. Such alternative objects/classes are within the scope of the subject specification.

Designer component 125 can employ the contents of stores 145 and 155 when incorporating features in the design of an application (e.g., application 135). In an aspect, designer component 125 comprises a graphical user interface (UI) that includes a designer surface (not shown) and a selection component (not shown) that provides with accessing metadata store 145 and class store 155. In another aspect, said features can determine a user experience when interacting with an application (e.g., application 135); for instance a feature can be a check box, a radio button, a field box (to input data from an input device such as a keyboard, keypad, stylus, touch screen, and so on) in a user interface, etc. Through the extensibility model supported by designer component 125, when extending a specific design feature (e.g., introducing specific attributes in a class associated with an adorner, which result in an alternative behavior of the adorner) a created EXTENSION is the relevant object. An associated EXTENSIONSERVER provides a mechanism to manage extant dependencies when introducing the extended specific feature in the designer component.

Test and manipulation component 110 can exploit extensibility in order to access (via communication framework 160) (i) services available to designer component 125, services which afford testing and manipulating an application (e.g., application 135), and/or (ii) invoke methods residing in library component 115 to test and manipulate said application. Test and manipulation component 110 can create an extension (e.g., TESTHOOKEXTENSION), or test object, that facilitates information retrieval from application 135 through designer component 135. Such an extension is associated to a corresponding extension server (e.g., TESTHOOKEXTENSIONserver), and is tied into the creation of any feature object (e.g., class FRAMEWORKElement) in designer component 125. In one aspect, TESTHOOKEXTENSION targets a MODELHIERARCHYSERVICE, wherein a Root object provides access to a topmost element (or feature) being designed and, for example, methods that afford accessing the topmost element's children. It is noted that while the MODELHIERARCHYSERVICE tends to return things of type "object", they can be cast to Item, which gives access to Properties, and naming information.

In addition, or alternatively, test and manipulation component 110 can utilize a plug-in component (not shown) that does not rely on an extensibility model to conduct test and manipulation of an application (e.g., application 135) coupled to a designer component (e.g., component 125). Such a plug-in component can reside in test and manipulation component 110, and can provide for running test/manipulation code in a process that is to be tested or manipulated within the designer component (see below). It should be appreciated that said plug-in component can also instantiate an extension server to access services that afford said test/manipulation code.

Test and manipulation component 110 also can establish aspects of communication framework 160 that facilitates to transmit information among processes associated with test and manipulation component 110 and designer component 125 (via application development component 120). Next, aspects of extension and extension server creation, as well as communication framework 160 are discussed. Such aspects are illustrated with code snippets associated with class definitions for example classes TESTHOOKEXTENSIONserver and TESTHOOKEXTENSION.

Creation of extension server/plug-in application.—As discussed above, to exploit an extensibility model to test and manipulated a designed or in-design application, creation of an extension server class is necessary. In an aspect, to benefit from an example designer component editing model, which provides services for the designer component, creation of an extension server can be effected when the designer component is initialized. An example creation mechanism includes, as discussed above, tying the creation of the extension server (e.g., TESTHOOKExtensionserver) through a class associated to a feature element (e.g., FRAMEWORKElement) when said feature is first created in a designer surface of a designer component (e.g., component 125). As an example, creation of TESTHOOKEXTENSIONserver entails creation of extension class TESTHOOKEXTENSION, which, in an aspect, inherits from EXTENsion and requires the TESTHOOKExtensionserver to manage it. The following is an example code snippet that implements the test extension class accordingly, and is appropriate for a designer component in Microsoft® Visual Studio:

```
[ExtensionServer(typeof(TestHookExtensionServer))]
public class TestHookExtension : Extension {
    public TestHookExtension( ) {
    }
}
```

In addition, it is necessary to set up the extension server and indicate that is works with test extension TestHookExtension:

```
public class TestHookExtensionServer :
ExtensionServer<TestHookExtension> {
    public TestHookExtensionServer(ExtensionManager manager)
        : base(manager){
    }
}
```

It should be appreciated that the extension server acts as a plug-in component that provides services to a designer component (e.g., component 125).

Creation of test extension.—To ensure creation of TestHookExtension upon first creating a feature in the surface designer, it is necessary to establish the class is required. A possible manner to accomplish that is to add an attribute to FrameworkElement class that establishes: [Extension(typeof (TestHookExtension))]. Typically, library infrastructures in an application development component, such as component 120, prevent a user from introducing such an extension. However when an application development component (e.g., component 120), or a designer component (e.g., component 125) adopt a CLR, attributes to class (e.g., class extension) can be added via a metadata store (e.g., metadata store 135). To the accomplishment of that, an attribute table associated with the test extension (e.g., TestHookAttributeTable) is to be created and registered with the designer component (e.g., designer component 125).

Regarding communication framework 160, a particular framework is to be established for communication among processes, e.g., remote testing and manipulating (or remoting) and application designing. A possible, example approach to the subject inter-process communication (IPC) is CLR remoting. It should be appreciated that in the case application development component operates with Microsoft® Visual Studio, CLR remoting is native to the component. An alternative for IPC is to transfer memory-mapped files. It should be appreciated that substantially any multi-thread communication suite can be utilized for IPC; however, adequate dependencies need to be established.

CLR remoting as an instance of communication framework 160 to convey information among test and manipulation component 110 and designer component 125, affords at least three remoting patterns: (i) Single Call. The subject objects can service one and only one incoming request coming in. Single call objects can be useful in scenarios wherein the objects are required to do a finite amount of work, e.g., introduce metadata in a specific set of classes in a class store. Such objects typically are not required to store state information (in connection with a particular test or with a particular design in connection with an application (e.g., application 135)), and cannot retain state information between method calls, such as an invocation of a method that resides in method library 115. It is noted that single call objects can be configured in a load-balanced fashion.

(ii) Singleton Objects. Such objects correspond to objects that can service multiple clients and hence share data by storing state information between client invocations. Singleton object can be useful in cases in which data needs to be shared explicitly between clients, in addition to cases wherein overhead of creating and maintaining objects is substantial.

(iii) Client-Activated Objects (CAO). CAO are server-side objects that can be activated upon request from a client. Such a manner to activate server objects is similar to component object model (COM) co-class activation. When a client submits a request for a server object using a "new" operator, an activation request message is sent to the remote application. In an aspect, the server then creates an instance of the requested class and returns an objRef back to the client application that invoked it. A proxy (e.g., communicator proxy component 240) is then created on the client side (e.g., test and manipulation component 110) using the objRef. The client's method calls (e.g., a method within a set of libraries stored in library store 115) can be executed on the proxy. Client-activated objects can store state information between method calls for its specific client and not across different client objects. Each invocation of "new" returns a proxy to an independent instance of the server type.

In an aspect, CAO objects can facilitate creation of objects in the application development component 120, and designer component 125, by the test and manipulation component 110.

Each of the remote patterns (i)-(iii) require a remoting channel for traffic (e.g., result of method calls, object manipulation, data, and so on) communication. In an aspect, CLR remoting provides an IPCchannel that can allow in-memory communication, an Httpchannel that employs a SOAP protocol for communication, based on the Hypertext Transfer Protocol, and a TCPchannel that communicates traffic with a Transmission Control Protocol, employing a binary formatter to serialize traffic. It should be appreciated that a selected channel can be a wireless channel, wherein protocols for the transport layer are compatible with wireless remote communication.

It should be appreciated that test and manipulation of an application (e.g., application 135) through a designer (e.g., designer component 125) according to aspects disclosed herein can be exploited in substantially any application development component, such as Microsoft® Visual Studio, Windows Forms, Oracle Developer Tool, IBM® Rational® System Developer, and so forth.

Figure 2:
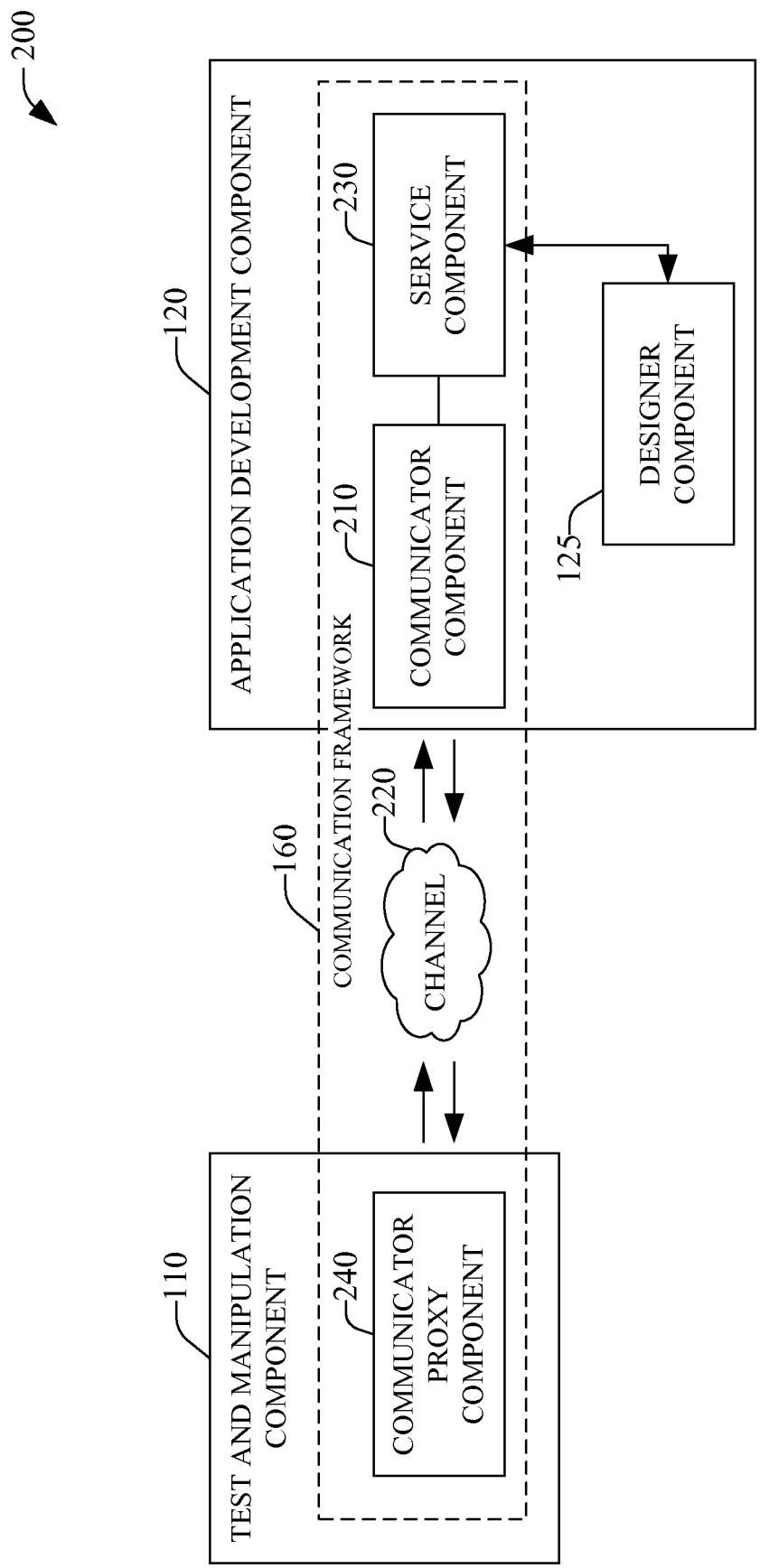
FIG. 2 is a block diagram of an example communication framework among a test and manipulation component and an application development component in accordance with an aspect of the subject specification.

FIG. 2 is a block diagram of an example communication framework 160 based on CLR remoting. Communication takes place via a communicator component 210. Such communicator component 210 can be characterized by a class termed TestCommunicator, which represents an object with methods to invoke from test and manipulation component 110—considered a client within communication framework 160—on the designer component 125 (via application development 120), which is deemed a server within communication framework 160. A communicator proxy 240 facilitates calling a method through the communication framework 160 on communicator component 210. In an aspect, communicator component 210 and communicator proxy 240 can provide for communicating among disparate processes involved in test and manipulation: (a) a test thread in a process within test and manipulation by component 110, and (b) a designer thread in a process associated with designer component 125 acting on application 135. In another aspect, to work correctly within the example CLR remoting, a restriction on TestCommunicator class can exist which requires said class to inherit a disparate class, e.g., MarshalByRefobject, associated with serialization of objects conveyed by reference via the communication framework 160. It should be appreciated that within CLR remoting, which is an example communication framework 160, to convey object across process boundaries said object are to be serializable objects—e.g., objects that can be represented as a binary stream or binary coded packages—as non-serialized objects can have references to memory in one process (e.g., a testing and manipulating method) that fail when "referred to" in a remaining process (e.g., designing of an application). It should further be appreciated that in case of inter-thread communication substantially all data types in an application are readily accessible without serialization; however, in the test and manipulation of an application as is disclosed herein, communication is effected among processes (e.g., inter-process communication) and serialization of wrapper object becomes necessary. Namely, data is wrapped into strings and integers before being sent to a test and manipulation process in test and manipulation component 110. Because of the aforementioned restriction, items cannot be sent directly from an editing model in a designer component (e.g., designer component 125) to a test and manipulation component (such as component 110). In addition, or alternatively, in an aspect, wrapper objects that are serializable can be created and sent across processes; for instance, (1) DesignItem, which can wrap an item from a designer component (e.g., component 125) editing model; and (2) DesignPropertyInfo, which can wrap an ItemProperty from a designer component's editing model.

Below are examples of code snippets to instantiate TestCommunicator in the server end (e.g., designer component 125) and the client end (e.g., test and manipulation component 110). It should be appreciated that, in example communication framework 160, channel 220 is selected to be IPCChannel and such selection is reflected in the example snippets corresponding to the instantiation of TestCommunicator. Additionally, channel 220 is assigned a specific URL to effect communication of serialized content, as discussed above.

```
public interface IApplicationPlugin {
    public void Register( );
}
class TestHook : IApplicationPlugin {
    public void Register( ) {
        Start( );
    }
    private void Start( ) {
        if (serverChannel == null) {
            // Create the server channel.
            serverChannel = new IpcChannel("localhost:4321");
    ChannelServices.RegisterChannel(serverChannel);
            RemotingConfiguration.ApplicationName = "AppToTest";
    RemotingConfiguration.-
    RegisterActivatedServiceType(typeof(TestCommunicator))
    ;
        }
    }
```

It should be appreciated that in test and manipulation component 110, communication framework 160 comprises a proxy component, necessary for communication as discussed above in connection with the CAO remoting pattern.

It is noted that, in an aspect, TestCommunicator object does not load in the designer thread (e.g., server end process) associated with designer component 125 when acting on an application (e.g., application 135). Therefore, communicator object TestCommunicator can be unable to convey traffic to a designer component's editing model as said object cannot be designed to be thread-safe, in addition to possible engineering aspects, such as lack of multi-thread traffic, of the application

```
(i) Server:
    IPCChannel serverChannel;
        private void Start( ) {
            if (serverChannel == null) {
                // Create the server channel.
                serverChannel = new IpcChannel("localhost:4321");
    System.Runtime.Remoting.Channels.ChannelServices.RegisterChannel(serverChannel);
                RemotingConfiguration.ApplicationName = "AppToTest";
    RemotingConfiguration.RegisterActivatedServiceType(typeof(TestCommunicator));
            }
(ii) Client:
    System.Runtime.Remoting.Channels.ChannelServices.RegisterChannel(new
    IpcChannel( ));
    RemotingConfiguration.RegisterActivatedClientType(typeof(TestCommunicator),
    "ipc://localhost:4321/AppToTest");
        TestCommunicator communicator = new TestCommunicator( );
```

It is noted that the in the above snippet, IPC channel port is illustrative. It is noted that the server code has to "register" the server end in the communication framework 160 before the client end code can communicate. In an aspect, for test and manipulation component 110, the need to register the server end can result in creation failure of the TestCommunicator object in test and manipulation component 110 in cases designer component 125 fails to be active.

In case of performing test and manipulation of an application utilizing a plug-in component, a TestCommunicator object is also to be registered and started, as illustrated in the example code snippet below. Plug-in component is associated with a TestHook class.

development component (e.g., component 120) in which the designer component resides. To adequately communicate with TestHookExtensionServer, communicator component 210 employs an intermediary service component 230 that can be provided by the application development component 120; as an example, in Microsoft® Visual Studio the intermediary service component corresponds to a "dispatcher" service provided by Windows Presentation Foundation. In another aspect, TestHookExtensionServer can provide a method termed InvokeMethod that allows for proper access based on a dispatcher service. The following example code snippet illustrates invocation of the method that employs the dispatcher service, embodied in the intermediary service component in an example application development component that employs Windows Presentation Foundation.

```
public object InvokeMethod(Delegate method) {
    return _dispatcher.Invoke(DispatcherPriority.Send,
  method);
  }.
```

Figure 3A:
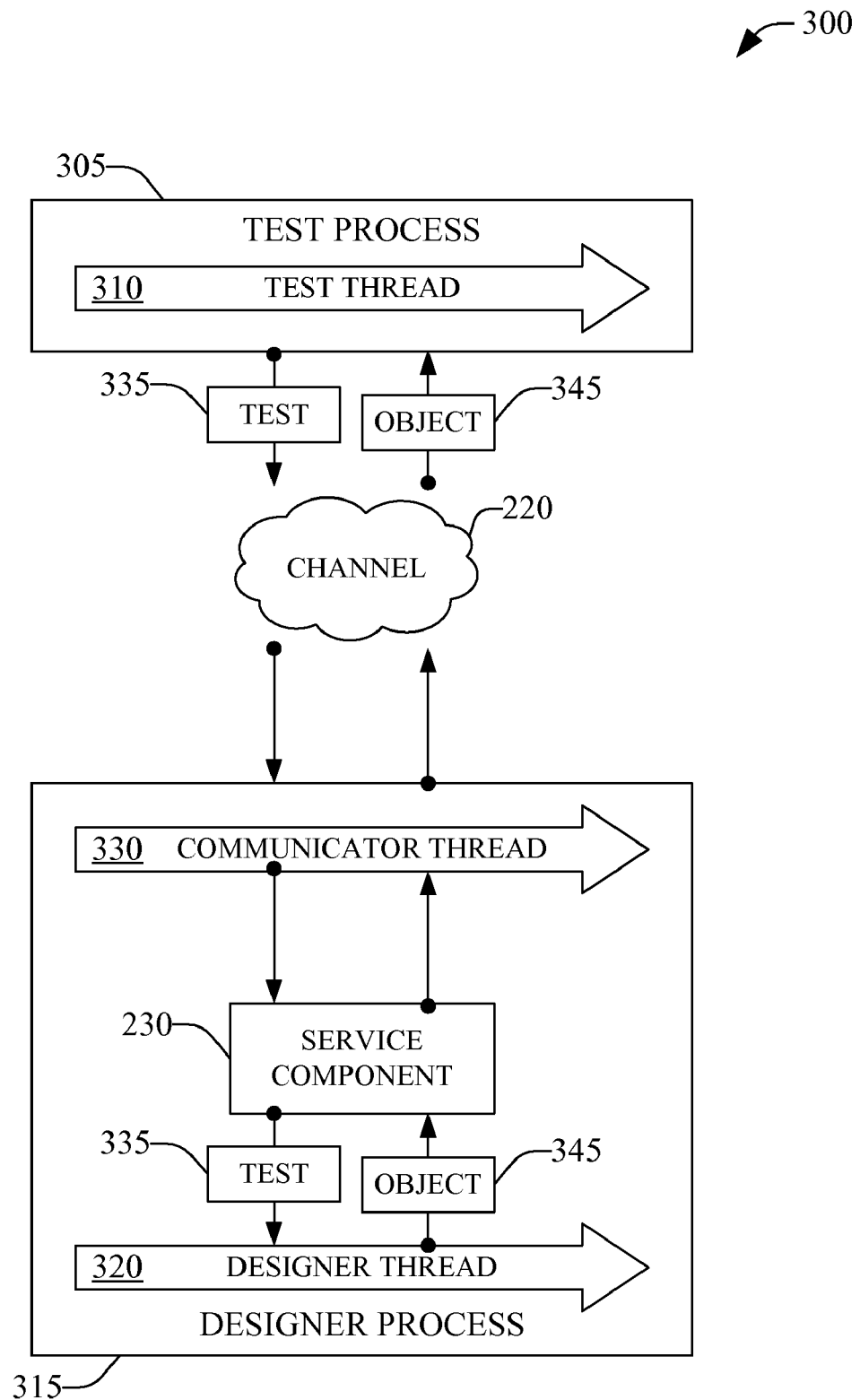
FIGS. 3A and 3B are schematic diagrams that illustrate, respectively, traffic among processes in the case of a test and of a manipulation of a designed, or in-design, application.
Figure 3B:
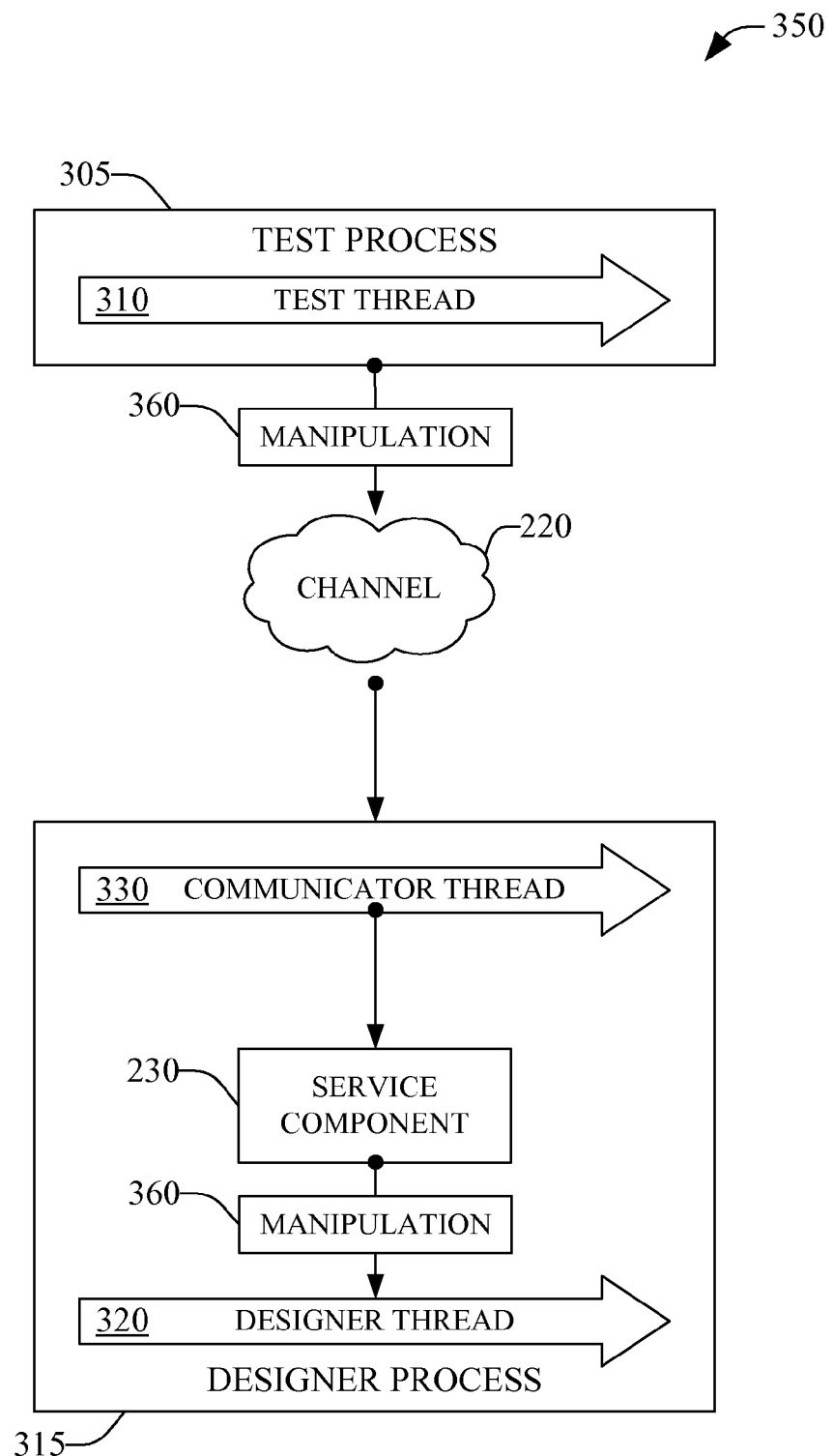

FIGS. 3A and 3B are schematic diagrams that illustrate, respectively, traffic exchange among two processes in the case of a test and of a manipulation of a designed, or in-design, application. Diagram 300 illustrates a test 335 of an application (for example application 135; not shown) conveyed from test process 305 to designer process 315. Test process 305 includes a test thread 310, while designer process includes two threads: designer thread 320 and communicator thread 330. Communicator thread originates from creation and initialization of a communicator component, such as TestCommunicator (see above). Communication among designer thread 320 and communicator thread 330 is accomplished through intermediary service component 230, by exploiting a dispatcher service as discussed above. A test can include invoking substantially any of the methods within the set of libraries stored in library store 115. Moreover, verification of the internal state of an application can be accomplished with a test (e.g., test 335). As an example, a test can be a GetAllItems test, which retrieves substantially all of a design model item controls in a designer form. Additionally, another example test can be a GetLayout method, whence actual sizes of controls employed on a user interface and loaded during design time, or execution, by a design component can be retrieved. A test typically elicits a response, which can include conveying an object 345 (e.g., a class, a method, metadata, data, and so on). As mentioned above, inter-process communication of the response from designer process 315 to a test process 305 can be accomplished through serialization of the response's content (see above). Received content in test process 305 is deserialized in the test and manipulation component (e.g., component 110) that executes the test process. Deserialized content can be post-processed for analysis.

Diagram 350 illustrates a manipulation of an application (for example application 135; not shown) conveyed from test process 305 to designer process 315 through channel 220. Intermediary service component 230 facilitates communication among a designer thread 320 and communicator thread 330, by exploiting a dispatcher service (e.g., Dispatcher in Windows Presentation Foundation) available to application development component 120. Manipulation can be effected by substantially any of the methods included in a set of libraries in library store 115 as well as libraries available to application development component 120. In an aspect, manipulation can comprise calling a method in a library to manipulate a external control devices associated with an application (e.g., application 135), such as a mouse, keyboard, joystick, an so on. In another aspect, a manipulation may consist of changing metatada associated with attributes in classes within the application's code to indicate that certain aspects of the application that can be necessary to monitor/test. For example, in business intelligence, a data mining application analyzing an enterprise data can estimate the risk of losing a customer to a competitor; manipulation 360 can modify attributes of classes and methods within the application to persist such information to either a file or a database for compilation and further analysis (e.g., a time series analysis of risk, or clustering of customers of the enterprise according to risk). In another aspect, manipulation can be effected at design time or execution of an application, wherein classes in an application's code are retained without change; however, the design instance is modified such as altering a design feature including, for example, eight radio buttons to a feature comprising three check boxes and five radio buttons. It should be appreciated that other possible changes in user experience are possible at design time or during execution. It is noted that classes and metadata corresponding to the application are loaded by an application development component (e.g., component 120) at the time of retrieving an application for (re)design. Therefore, manipulation thereof can be effected through a designer component according to aspects described hereinbefore.

Figure 4:
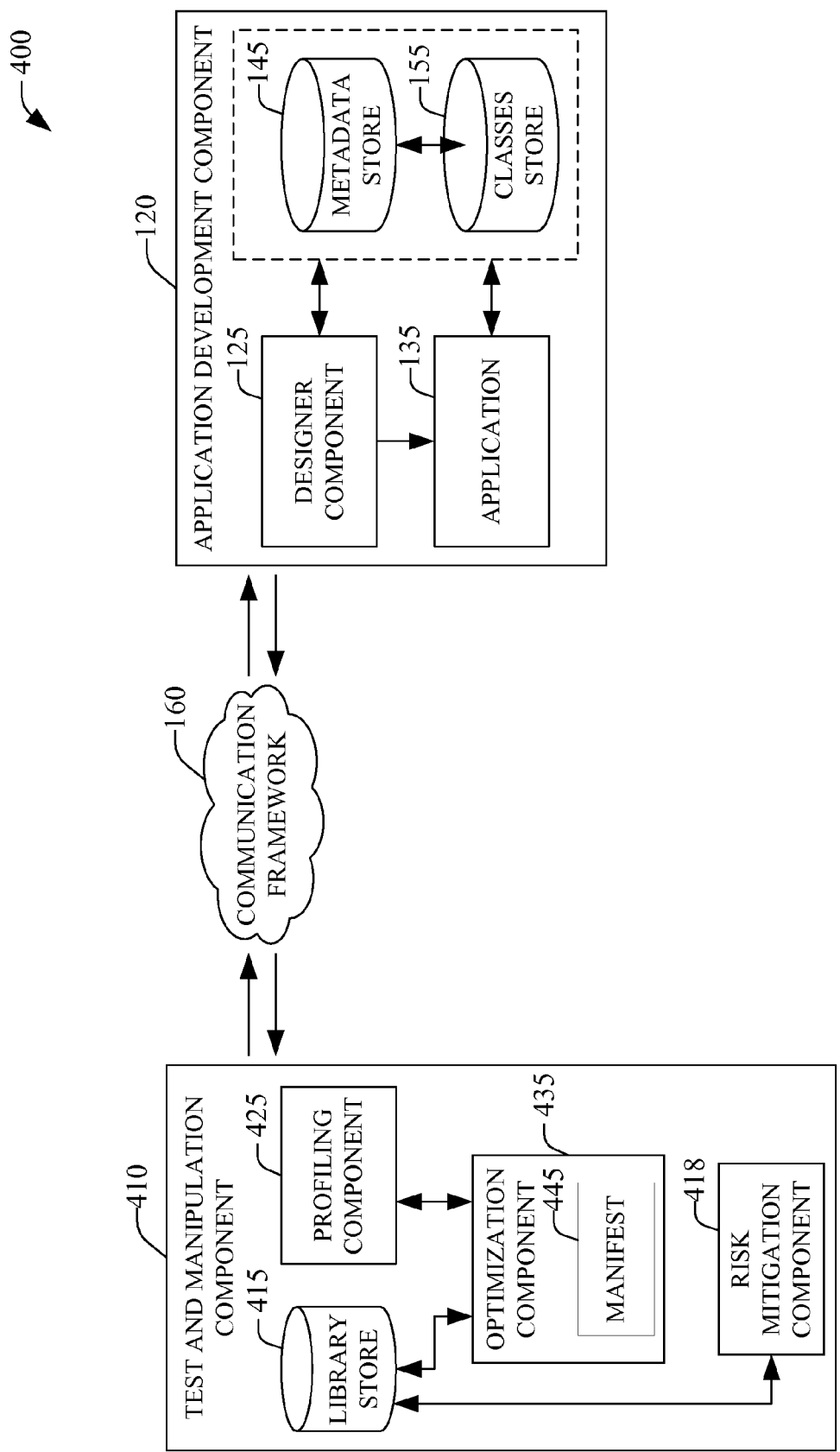
FIG. 4 illustrates a block diagram of an example system to optimize an application through a test and manipulation component according to an aspect disclosed herein.

FIG. 4 illustrates a block diagram of an example system 400 to optimize a designed, or in-design, application through a test and manipulation component 410. A method library store 415 behaves and functions in substantially the same manner as library store 115, containing a set of libraries that can be employed to conduct tests on an application (e.g., application 135) or manipulate said application. In addition, risk mitigation component 418 operates in substantially the same manner as risk mitigation component 118. A profiling component 425 utilizes a series of specific methods aimed at gathering detailed information on substantially all functional aspects of an application (e.g., application 135) in an application development component 120. Such information can include, class dependencies, metadata for attributes, number of classes, methods employed in the classes, data types employed in the application, as well as design aspects such as indicia employed in user interfaces deployed by the application. Upon application/invocation of such methods, results of profiling tests are gathered by test and manipulation component 410 in the manner described hereinbefore. An optimization component 425 analyzes the received results and generates a manipulation strategy to re-design and/or re-develop the profiled application 135.

Optimization component can employ a manifest 445 that includes metrics for optimization, or objective functions, such as performance of specific portions of application 135, to optimize the application. Such performance-oriented optimization can include restructuring classes in the application's code, as well as modifying data types and methods employed in a set of classes pertinent to the optimization. As an example, an application that executes properly in a desktop computer, employing a central process unit for execution, can be optimized for execution in a graphical processing unit in order to provide richer graphics and an overall user experience. In addition, manifest 445 can include user response to specific design aspects of application 135 that can also be employed as a training set for unsupervised learning, which can lead to an optimized application. For example, application 135 can be optimized for a specific segment of users of the application based on a few design instances (generated, for example, with designer component 125) and a sample response of the targeted group of users.

To optimize an application through internal data and a profile extracted via test and manipulation component 410, optimization component 435 can employ artificial intelligence. The term "intelligence" refers to the ability to reason or draw conclusions about, e.g., infer, the current or future state of a system based on existing information about the system. Artificial intelligence (AI) can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. In particular, the AI component 248 can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Figure 5:
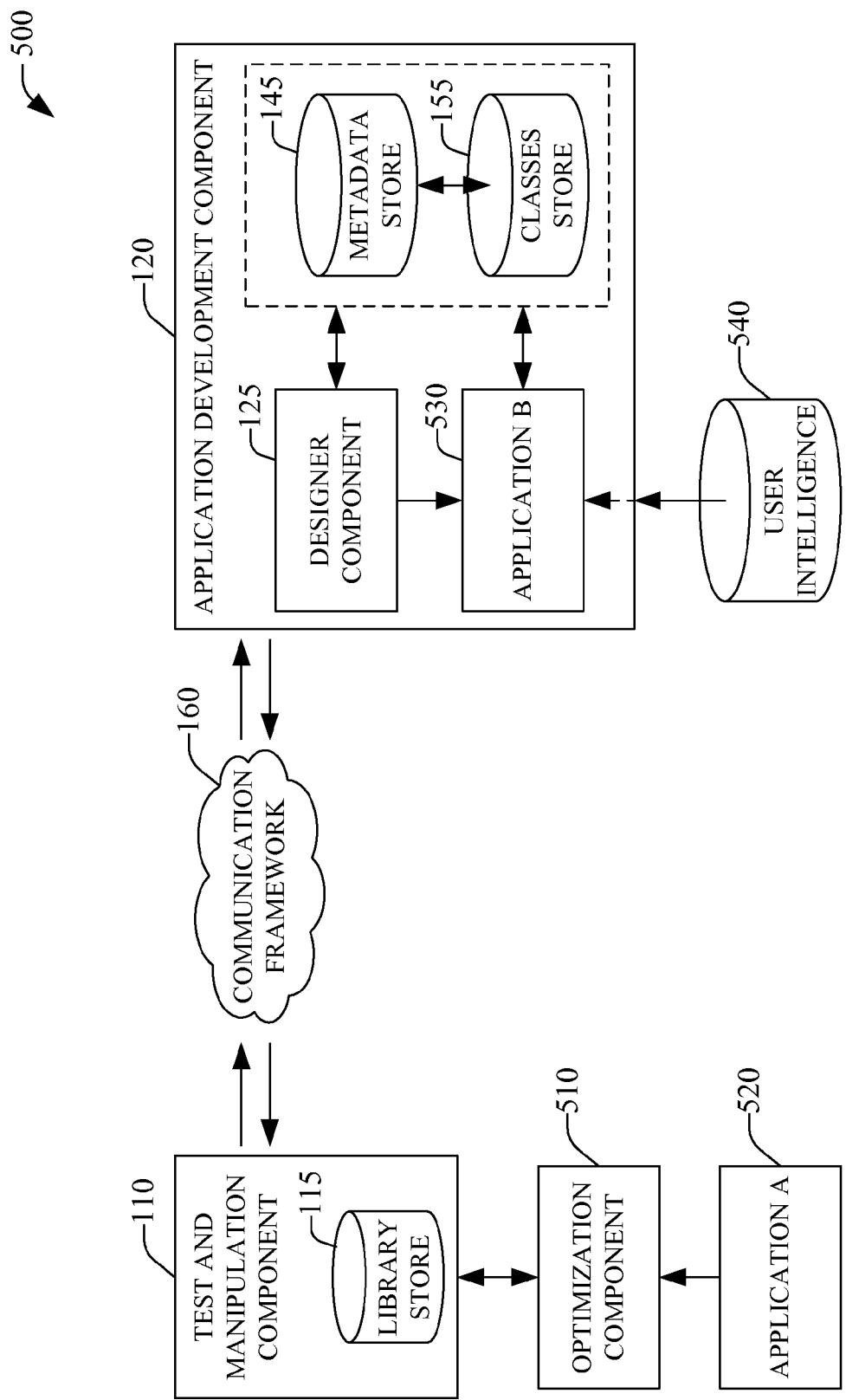
FIG. 5 illustrates a block diagram of an example system that optimizes functionality and design of a first application based on user intelligence and a second, dependent application.

FIG. 5 illustrates a block diagram of an example system 500 that optimizes functionality and design of a first application based on user intelligence—e.g., user demographics, consumer behavior, indicia preference, and so forth—and a second dependent application. Test and manipulation component 110 is coupled to optimization component 510 which gathers information of a first application A 520, and operates substantially like optimization component 435. Information on a second application B 530 residing in an application development component 120, and coupled to a designer component 125, is extracted through test and manipulation component 110 according to aspects discussed supra. In addition to application B 530, a user intelligence store 540 is coupled to application development component 120, to provide with information on users that can employ application B 530. It should be appreciated that user intelligence allows customizing the design of application B 530. Moreover, application B 530 is designed and developed to depend on and operate with application A 520. It should be appreciated that application A 520 can be an application that cannot be reverse engineered due to licensing conditions, in such a case its functionality and design is substantially fixed. In such scenario, optimization component 510 can optimize application B 530 to target specific user characteristics, e.g., technically savvy or early adopter users or fairly technology reticent users, conservative users or liberal users, user with specific accessibility needs—specially in web-based applications, and so on, as well as to provide functionality that is maximizes utilization of application A 510. Application optimization can proceed by utilizing test and manipulation component 110 to gather information on the functionality of application B 520 and manipulate application B 530 according to user target, and artificial intelligence to infer design and functionality aspects that optimize application B 530.

FIGS. 6-9 illustrate various methodologies in accordance with the disclosed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

Figure 6:
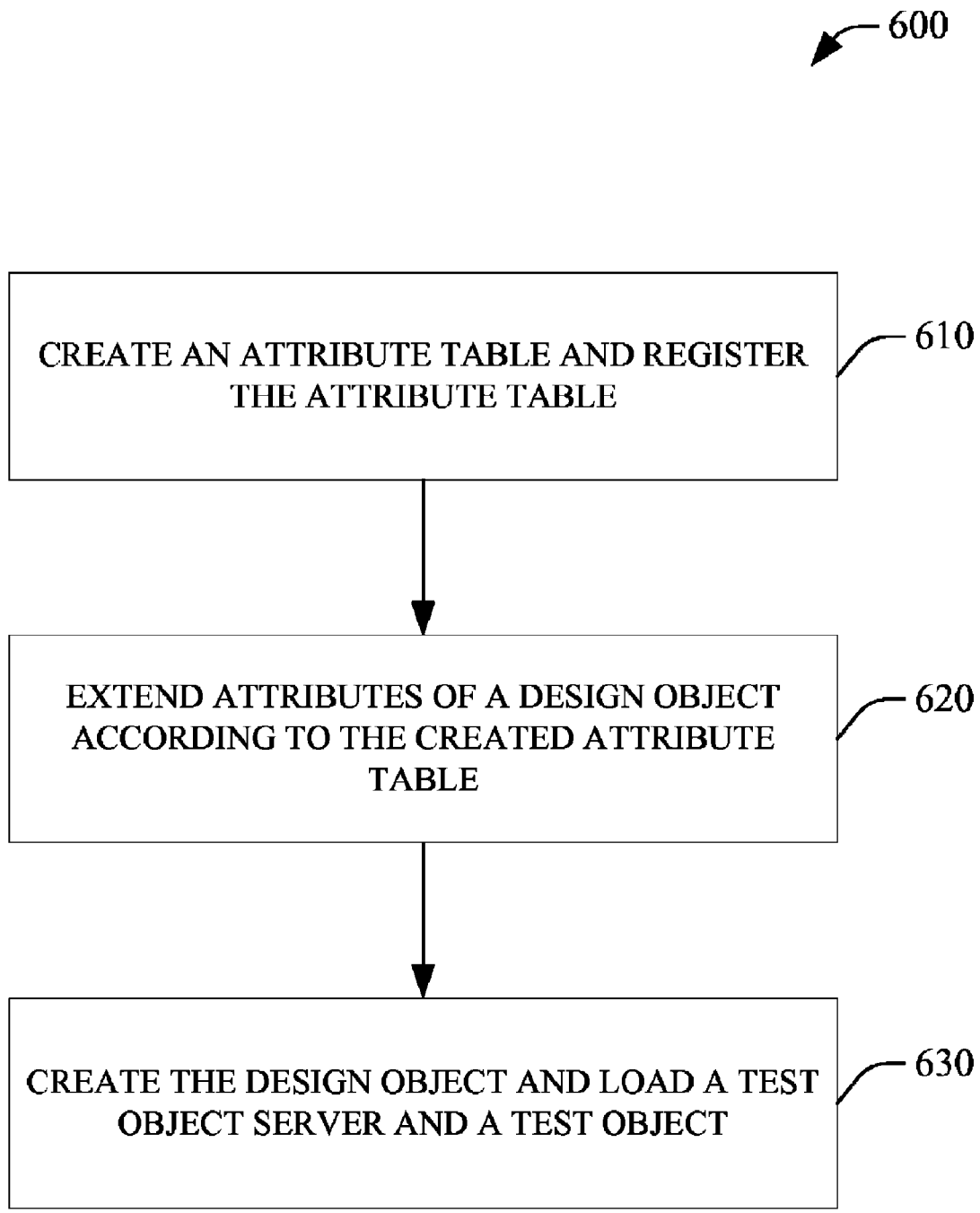
FIG. 6 presents a flowchart of an example method for loading a test object server and a test object.

FIG. 6 presents a flowchart of an example method 600 for loading a test object server and a test object. At act 610, an attribute table is created and registered. The attribute table contains custom attributes for facilitating extensibility of classes that can be available to an application, a designer component (e.g., component 125), or an application development component (such as component 120). Creation of the custom attribute table can proceed as discussed in connection with FIG. 1. Extensibility typically augments the functionality of a class through added metadata, which can modify methods, data types, and dependencies. At act 620, the attributes of a design object are extended according to custom attributes of the registered attribute table. A design object can be a class available to a designer component; for instance FrameworkElement, which is created when an element of the designer component is created in the designer component surface. In another example, an extended attribute can indicate that a specific object is to be downloaded upon creation of a class that carries the extended attribute. At act 630, the extended design object is created in a designer component, and a test object server and a test object are loaded.

Figure 7:
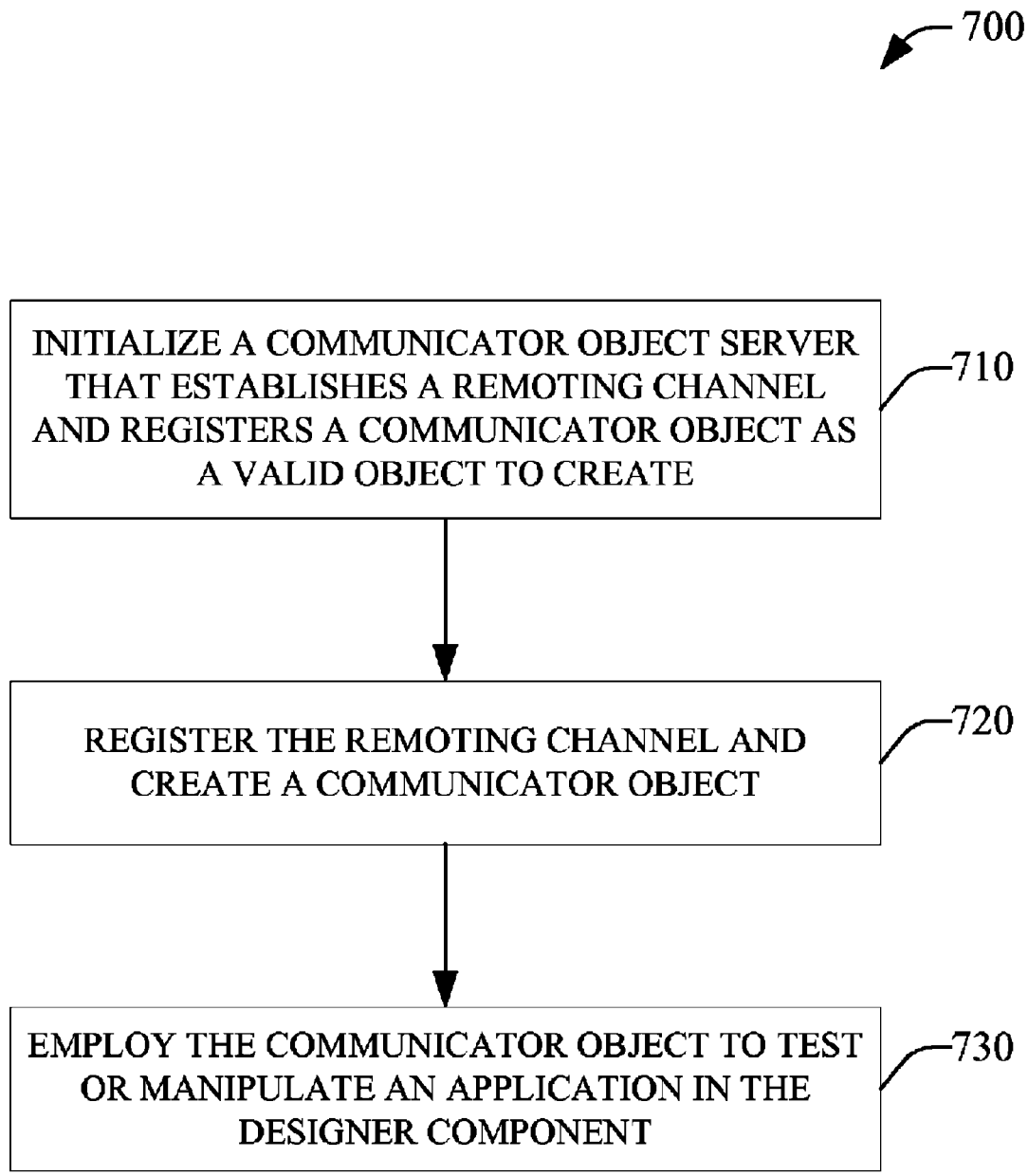
FIG. 7 presents a flowchart of an example method for communicating across processes to facilitate testing and manipulating an application.

FIG. 7 presents a flowchart of an example method 700 for communicating across processes to facilitate testing and manipulating an application. At act 710, a communicator object server is initialized. The communicator object server establishes a remoting channel (e.g., channel 220) and registers a communicator object (communicator component 210) as a valid object to be created. A remoting channel determines the manner in which data is physically transported among ports, components, or applications, and typically involves a transport protocol. In an aspect, in CLR remoting three channels are possible: ICPChannel, HttpChannel, and TCPChannel. In order to utilize an object that is created, e.g., a communicator object, the object needs to be registered. In an aspect, a client end (e.g., a test and manipulation component 110) can register a communicator object once a server end (e.g., a designer component) is active. At step 720, the remoting channel (e.g., channel 220) is registered and a communicator object is created. Registering the remoting channel affords access to services in a set of remoting classes that are compatible with the registered channel. Such services can be available through an application development component, such as component 120. In an aspect, act 720 proceeds as described in connection with FIG. 2. At step 730, the communicator object is employed for submitting tests aimed at probing an application for the purpose of product testing and profiling (see, e.g., FIG. 4), as well as manipulating the application, which in an aspect can provide for optimizing an application according to specific optimization metrics, as well as altering a user's experience through design modifications. It should be appreciated that testing and manipulating can take place across processes such as a test process (for example, test process 305) and a designer process (e.g., designer process 315) which include, respectively, a test thread (e.g., thread 310) and a designer thread (e.g., thread 320) and a communicator thread (e.g., thread 330)—see FIGS. 3A and 3B.

Figure 8A:
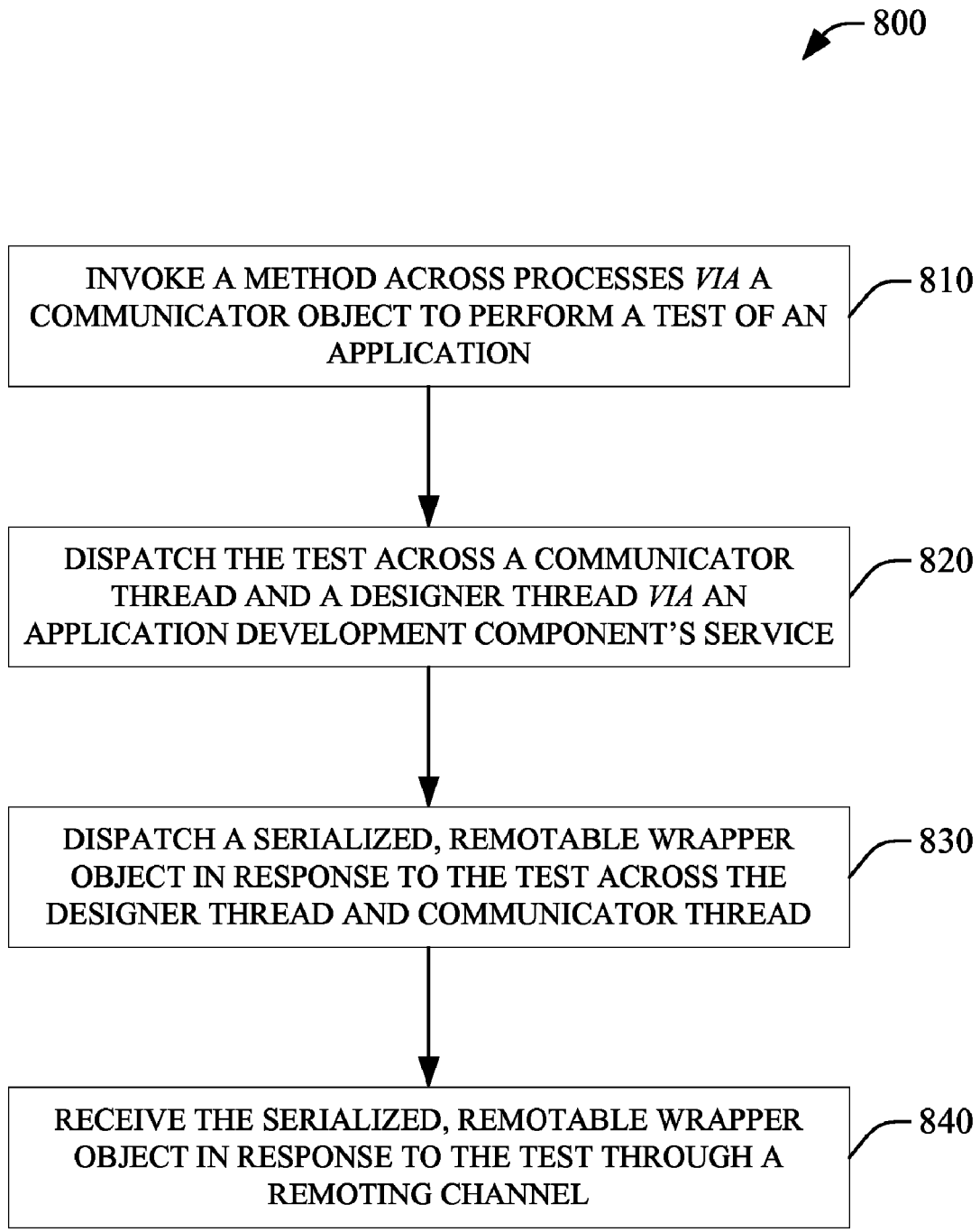
FIGS. 8A and 8B present flowcharts of example methods for receiving an object in response to a test applied to an application and manipulating an application according to an aspect of the subject innovation, respectively.

FIG. 8A presents a flowchart of an example method 800 for receiving information as a result of a remote test. At act 810, a method to perform a test of an application is invoked across processes (e.g., test process and designer process; FIGS. 3A and 3B) via a communicator object, or communicator component (e.g., component 210). The communicator object, or communicator component, is registered and created at a server end, in a development application component (e.g., component 120). It is noted that the communicator object, or communicator component, is accompanied by a communicator proxy component (e.g., component 240) which is created upon invocation of the method. In an aspect, the test to be performed on an application can expose internal data structure of the application at design time or during execution. In addition, the test can reveal an internal state of the application. At step 820, the test is dispatched across a communicator thread (associated with the creation of the communicator object, or communicator component) and a designer thread (associated with a designer component coupled to the application) via an application development component (e.g., component 120) that employs a service of an application development component. In an aspect, when the application development component (e.g., component 120) is based on Windows Presentation Foundation, the service corresponds to a "dispatcher" service, which allows invoking methods across processes and as such acts can act as an intermediary service component (e.g., component 230). Moreover, the development object can correspond to a specific method that facilitates invoking the service. At act 830, in response to the performed test, a serialized remotable wrapped object is dispatched across the designer thread and communicator thread. The serialized object is transmitted across processes through a remoting channel (e.g., channel 220 in communication framework 160). As mentioned above, the remoting channel can transport the object through network layers between origin and destination port. It should be appreciated that the remoting channel is aware of such ports. At step 840, the serialized, wrapper object is received in response to the test. The wrapped object carries the information resulting from the application of the test that is invoked in act 810. Communicator proxy component can receive the object and provide to a test and manipulation component (e.g., component 110) for further processing.

Figure 8B:
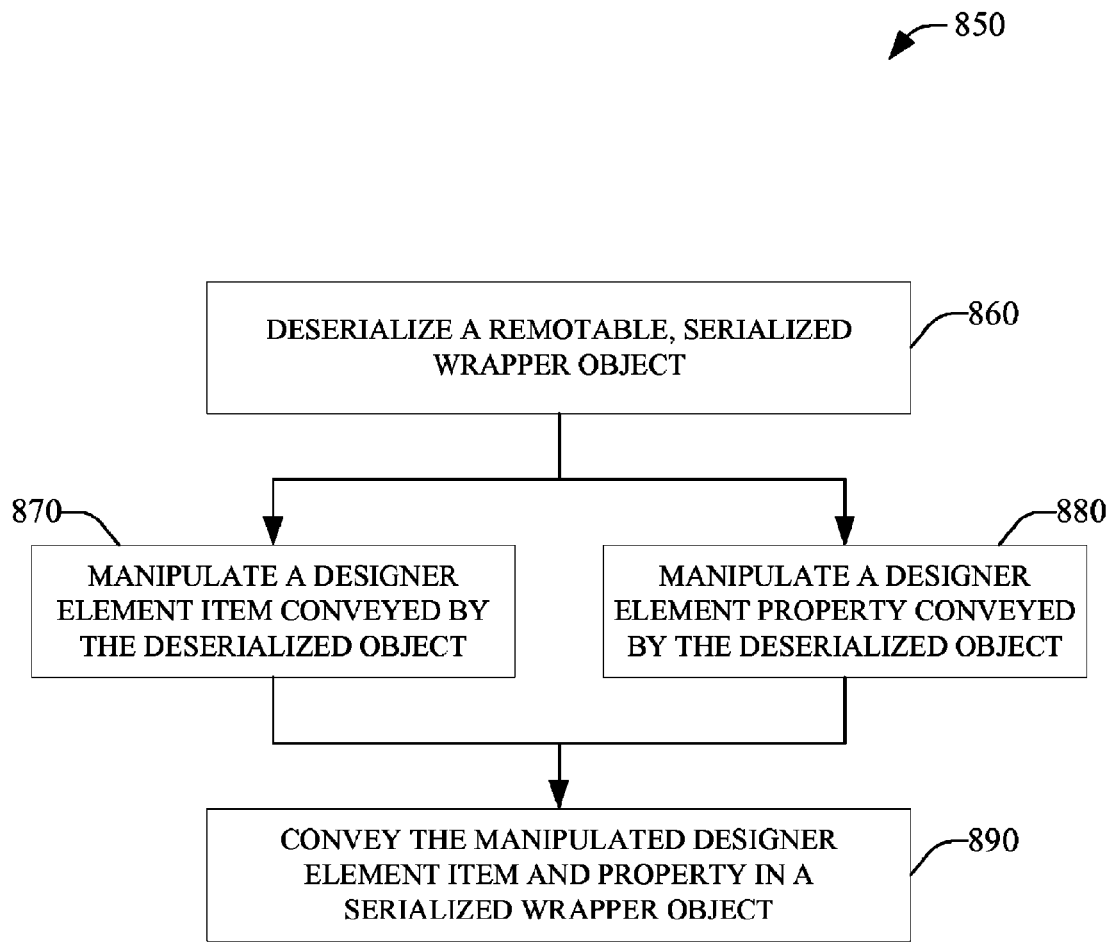

FIG. 8B presents a flowchart of an example method 850 for manipulating an application through manipulating a designer element item and property. At act 860, a remotable, serialized wrapper object is deserialized. As a result, information carried by the wrapper object is extracted. As discussed above, in an aspect, the information is conveyed in terms of two objects: (a) DesignItem and (b) DesignPropertyInfo. At act 870, the design item conveyed by the deserialized object is manipulated, while at act 880, the design property conveyed by the deserialized object is manipulated. Manipulation can be originated in various sources. In an aspect, manipulation results from an optimization process that aims at optimizing application performance. In another aspect, manipulation can arise from a process that seeks to optimize a user's experience (see FIG. 4). In yet another aspect, manipulation can be the result of customizing a second application for a target segment of users while optimizing functionality with respect to a related first application (see FIG. 5).

Figure 9A:
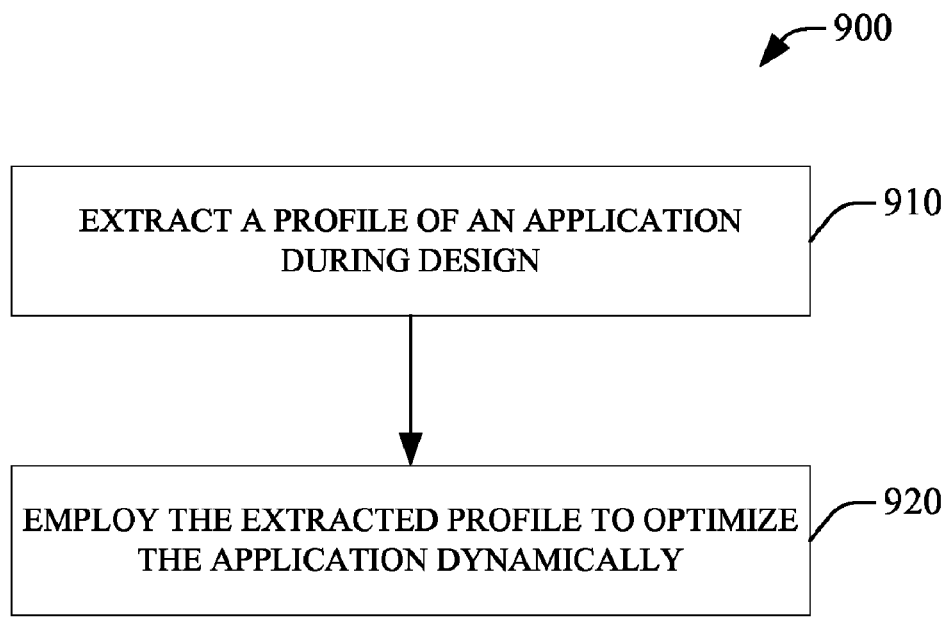
FIGS. 9A and 9B present flowcharts of example methods for optimizing an application through gathering information on the application in accordance with aspects of the subject disclosure.

FIG. 9A presents a flowchart of a method for optimizing an application dynamically. At act 910, a profile of an application is extracted during design. In an aspect, the profile results from applying of a set of tests to an application at design time or execution; a test and manipulation component (e.g., component 410) that includes a profiling component (e.g., component 425) can be employed to generates the tests, invoke corresponding methods, and retrieve the results of the tests (for example, via multiple instances of method 800). At act 920, the profile is employed to optimize the application dynamically. It should be appreciated that the profiling is conducted at design time or during execution of the application, therefore characteristic of a designed application can be probed (via tests) periodically, or at specified times as design progresses. In response to the test, and through manipulation driven by an optimization the design can be altered at each time there is available information in a profile. It should be appreciated that the optimization can be dictated by multiple aspects (see FIG. 4).

Figure 9B:
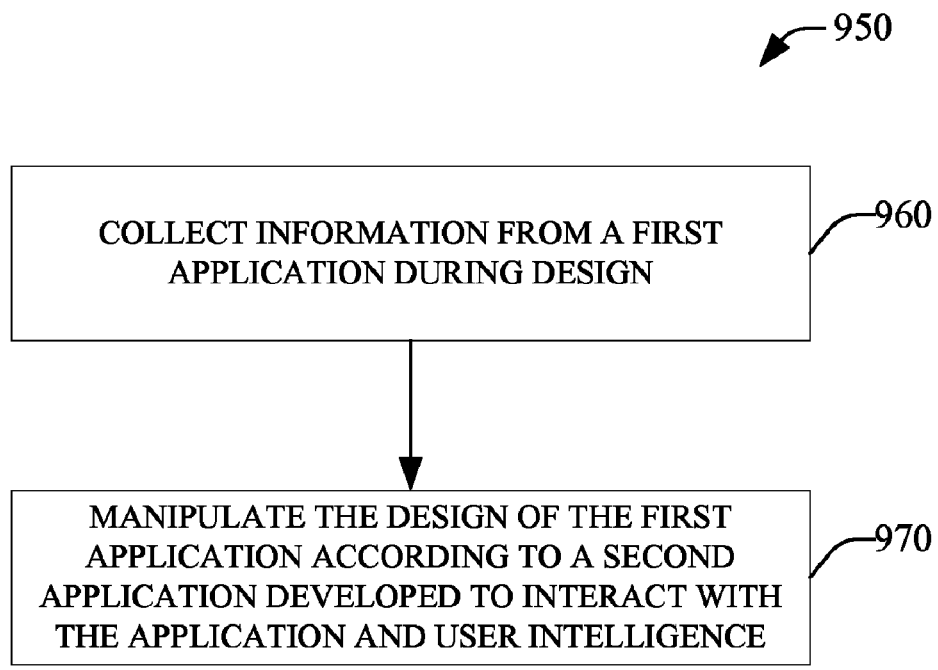

FIG. 9B presents a flowchart of an example method 950 for optimizing an application based on a disparate application and user intelligence—e.g., user demographics, consumer behavior, indicia preference, and so forth—regarding users of the application. At act 960, information on a first application is collected during design; such collection can be effected through a test and manipulation component (e.g., component 110). It should be appreciated that act 960 is substantially the same as act 910 in method 900. At act 970, the design of the first application is optimized according to characteristics of a second application developed to interact with the first application. In addition, the design of the first application is manipulate according to user intelligence. Manipulation aims at optimizing the first application according to information on users to whom the first application can be targeted, and functionality of a second application which is to be employed in conjunction with the first application. As an example, a text messaging application to be employed on a wireless phone can be designed with features that depend on the operating system that can be executed on the cellular phone processor, as well as media that is available to the cellular phone. Design manipulation can be accomplished through a test and manipulation component, such as component 110.

Figure 10:
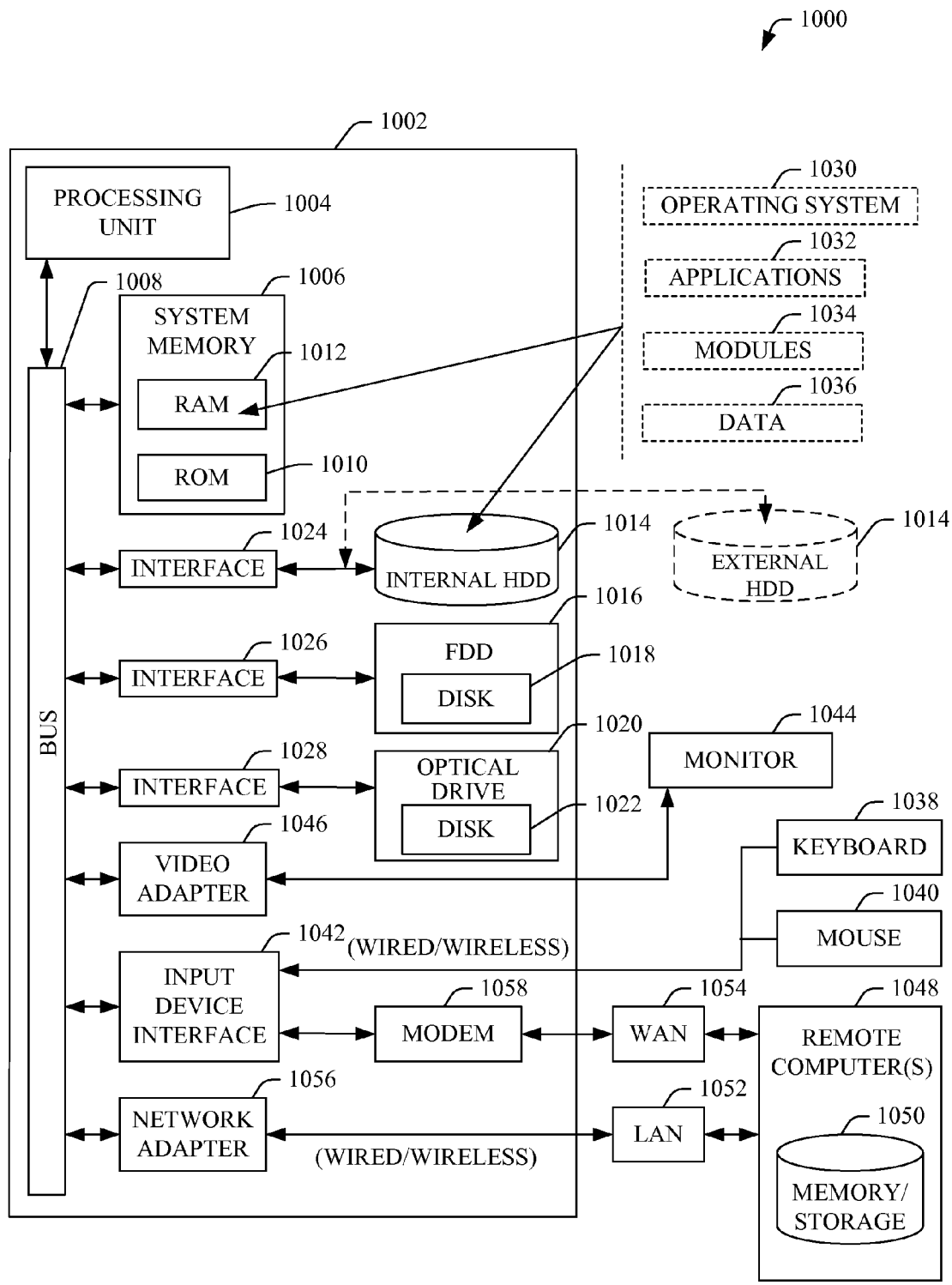
FIGS. 10 and 11 illustrate computing environments for carrying out various aspects described herein.
Figure 11:
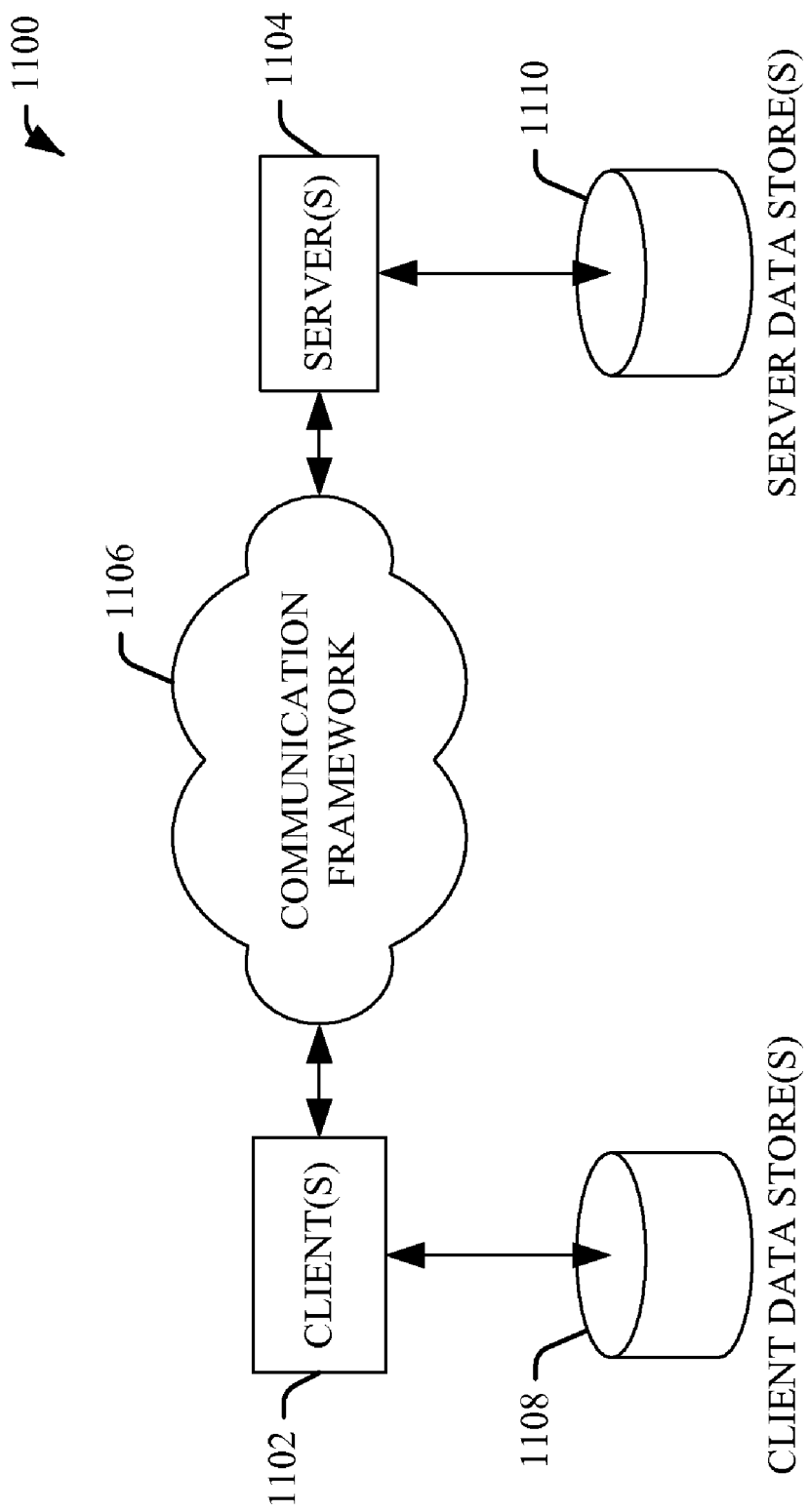

In order to provide additional context for various aspects of the subject specification, FIGS. 10 and 11 and the following discussions are intended to provide a brief, general description of a suitable computing environment 1000 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

In FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 408 via an interface, such as a video adapter 1046. In addition to the monitor 444, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 11 illustrates a schematic block diagram of a computing environment in accordance with the subject specification. The system 1100 includes one or more client(s) 1102. The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method, comprising using at least one processor to execute instructions stored on at least one computer-readable storage medium to perform operations including:
    configuring a test and manipulation component to manipulate and apply a test to an application at design time or at runtime;
    configuring an application development component including a designer component to facilitate design of the application; and
    configuring a communication component to facilitate communication between the test and manipulation component and the application development component, and to implement a Common Language Runtime (CLR) channel for remote testing and manipulation using at least three patterns associated with the remote testing and manipulation, the at least three patterns including
    a single call object pattern configured to service one and only one incoming request,
    a singleton object pattern configured to service multiple clients and share data by storing state information between client invocations, and
    a client-activated object pattern configured to store state information between method calls for a specific client.

2. The method of claim 1, further comprising implementing the CLR channel as at least one of an inter-process communication channel allowing in-memory communication, a hyper-text transfer protocol channel employing a simple object access protocol for communication, or a transfer control protocol channel employing a binary formatter to serialize traffic.

3. The method of claim 1, further comprising:
    creating an attribute table;
    extending attributes of a design object in the attribute table;
    creating the design object with the extended attributes; and
    loading a test object and loading a test object server upon creation of the design object.

4. The method of claim 3, the employing the communicator object for testing and manipulating an application at design time or runtime including invoking a test method across processes through the test object on the test object server.

5. The method of claim 4, the invoking a test method across processes through the test object on the test object server including employing an application developer's service to convey a method across threads.

6. The method of claim 5, further comprising including, in the threads, a communicator thread associated with communicating among the test object and the test object server, and a designer thread associated with designing the application.

7. The method of claim 5, the employing the communicator object for testing and manipulating an application at design time or runtime further comprising receiving a serialized wrapper object.

8. The method of claim 7, further comprising conveying, in the received serialized wrapper object, a designer element Item and properties of the designer element Item.

9. The method of claim 7, further comprising deserializing the received serialized wrapper object and modifying the designer element Item and the designer element Item properties.

10. The method of claim 9, further comprising:
serializing the modified designer element Item and the modified designer element Item properties; and
conveying the serialized modified designer element Item and the modified designer element Item properties.

11. The method of claim 1, further comprising optimizing the application based at least on information gathered through testing the application at design time or runtime.

12. The method of claim 11, the optimizing the application based at least on the information gathered through testing the application at design time or runtime including optimizing the application based at least on a disparate applications or user intelligence.

13. A computer-implemented system, comprising at least one computing device configured with the following components:
a test and manipulation component configured to manipulate and apply a test to an application at design time or at runtime;
an application development component that includes a designer component configured to facilitate design of the application; and
a communication component configured to facilitate communication between the test and manipulation component and the application development component, and to implement a Common Language Runtime (CLR) channel for remote testing and manipulation, configured to use at least three patterns associated with the remote testing and manipulation, the at least three patterns including
a single call object pattern configured to service one and only one incoming request,
a singleton object pattern configured to service multiple clients and share data by storing state information between client invocations, and
a client-activated object pattern configured to store state information between method calls for a specific client.

14. The computer-implemented system of claim 13, wherein the test and manipulation component includes a library store that comprises a set of libraries to implement a test.

15. The computer-implemented system of claim 13, wherein the communication component includes a communicator component and a communicator proxy component.

16. The computer-implemented system of claim 15, wherein the communication component further includes a service component configured to connect the communicator component and the designer component.

17. The computer-implemented system of claim 13, wherein the test and manipulation component includes an optimization component configured to facilitate optimizing the application at design time based at least on a profile of the application extracted through tests.

* * * * *